(12) United States Patent
Li et al.

(10) Patent No.: US 11,016,024 B2
(45) Date of Patent: May 25, 2021

(54) AIR SCATTERING STANDARD FOR LIGHT SCATTERING BASED OPTICAL INSTRUMENTS AND TOOLS

(71) Applicant: KLA-Tencor Corporation, Milpitas, CA (US)

(72) Inventors: Frank Li, Danville, CA (US); Qing Li, San Jose, CA (US); Zhiwei Xu, Sunnyvale, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/279,395

(22) Filed: Feb. 19, 2019

(65) Prior Publication Data

US 2020/0264099 A1 Aug. 20, 2020

(51) Int. Cl.
*G01N 21/47* (2006.01)
*G01N 21/21* (2006.01)

(52) U.S. Cl.
CPC ............ *G01N 21/47* (2013.01); *G01N 21/21* (2013.01); *G01N 2021/4728* (2013.01); *G01N 2021/4792* (2013.01)

(58) Field of Classification Search
CPC ... G01N 2021/4728; G01N 2021/4792; G01N 21/21; G01N 21/47
USPC ........................................................ 356/338
See application file for complete search history.

(56) References Cited

U.S. PATENT DOCUMENTS

| | | | | |
|---|---|---|---|---|
| 4,362,387 A * | 12/1982 | Clark | ...................... | G01J 4/00 356/338 |
| 5,741,298 A | 4/1998 | MacLeod | | |
| 6,091,494 A * | 7/2000 | Kreikebaum | ...... | G01N 15/0205 356/336 |
| 6,326,608 B1 | 12/2001 | Wei et al. | | |
| 6,825,437 B2 * | 11/2004 | Nakano | .................. | G01N 21/51 156/345.24 |
| 2004/0066513 A1 * | 4/2004 | Okumura | .......... | G01N 15/0211 356/364 |

(Continued)

FOREIGN PATENT DOCUMENTS

| JP | 2018182521 A | 11/2018 |
|---|---|---|
| KR | 20050049261 A | 5/2005 |

OTHER PUBLICATIONS

International Search Report dated Jun. 12, 2020 for PCT/US2020/017415.

*Primary Examiner* — Roy M Punnoose
(74) *Attorney, Agent, or Firm* — Suiter Swantz pc llo

(57) ABSTRACT

An inspection system utilizing an air scatter standard includes one or more illumination sources to generate a beam of illumination, illumination optics configured to focus the beam of illumination into a volume of air contained within a chamber of an inspection chamber, one or more collection optics configured to collect a portion of illumination scattered from the volume of air, a detector configured to receive the collected portion of illumination from the one or more collection optics, a controller including one or more processors, communicatively coupled to the detector, configured to execute a set of program instructions to receive one or more signals from the detector and determine a state of the beam of illumination at one or more times based on a comparison between at least one of the intensity or polarization of the illumination scattered from the volume of air and a predetermine air scatter standard.

24 Claims, 10 Drawing Sheets

(56) References Cited

U.S. PATENT DOCUMENTS

| | | | |
|---|---|---|---|
| 2004/0184025 A1* | 9/2004 | Ohzu | G01N 1/2202 |
| | | | 356/28 |
| 2005/0207943 A1* | 9/2005 | Puzey | C12Q 1/04 |
| | | | 422/82.05 |
| 2007/0013883 A1* | 1/2007 | Park | G01N 15/0612 |
| | | | 355/18 |
| 2009/0046289 A1 | 2/2009 | Caldwell et al. | |
| 2011/0058167 A1* | 3/2011 | Knox | H04N 7/18 |
| | | | 356/338 |
| 2012/0080611 A1* | 4/2012 | Jones | G01J 1/0242 |
| | | | 250/458.1 |
| 2013/0016358 A1* | 1/2013 | Guttman | G01J 1/02 |
| | | | 356/445 |

* cited by examiner

310

320

330

AIR SCATTERING STANDARD FOR LIGHT SCATTERING BASED OPTICAL INSTRUMENTS AND TOOLS

TECHNICAL FIELD

The present invention generally relates to optical instruments and tools, and more particularly, to a standard for light scattering.

BACKGROUND

System calibration and alignment are necessary for optical systems to function properly. Optical systems often utilize a scattering standard to calibrate tools, monitor tool stability and health, and assist in optical alignment. Current scattering standards such as spectralon tiles and silicon wafer standards introduce a possible source of contamination, require an additional alignment step, increase cost, and degrade over time due to exposure to electromagnetic radiation and the environment.

As such, it would be advantageous to provide a system and method that provides improved system calibration that cures the shortfalls identified above.

SUMMARY

An inspection system for use with an air scattering standard is disclosed, in accordance with one or more illustrative embodiments of the present disclosure. In one embodiment, the inspection system includes one or more illumination sources configured to generate a beam of illumination. In another embodiment, the inspection system includes one or more illumination optics configured to focus the beam of illumination into a volume of air contained within a chamber of an inspection chamber. In another embodiment, the inspection system includes one or more collection optics configured to collect a portion of illumination scattered from the volume of air. In another embodiment, the inspection system includes a detector configured to receive the collected portion of illumination from the one or more collection optics. In another embodiment, the inspection system includes a controller that includes one or more processors communicatively coupled to the detector. In another embodiment, the one or more processors are configured to execute a set of program instructions stored in memory. In another embodiment, the set of program instructions are configured to cause the one or more processors to receive one or more signals from the detector indicative of an intensity of the illumination scattered from the volume of air. In another embodiment, the set of program instructions are configured to cause the one or more processors to determine a state of the beam of illumination at one or more times based on a comparison between the intensity of the illumination scattered from the volume of air and a predetermined intensity standard.

A method of utilizing an air scattering standard is disclosed, in accordance with one or more illustrative embodiment of the present disclosure. In one embodiment, the method includes generating a beam of illumination. In another embodiment, the method includes focusing the beam of illumination into a volume of air contained within a chamber of an inspection chamber. In another embodiment, the method includes collecting a portion of illumination scattered from the volume of air. In another embodiment, the method includes detecting, with a detector, the collected portion of illumination from the one or more collection optics. In another embodiment, the method includes determining a state of the beam of illumination, such as beam intensity and/or polarization, at one or more times based on a comparison between the intensity of the illumination scattered from the volume of air and a predetermined intensity standard.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1 through 5, a system and method utilizing an air scattering standard to monitor and measure scattering, in accordance with the present disclosure.

Embodiments of the present disclosure utilize air scattering as a scattering standard for optical systems and tools. Embodiments of the present disclosure are directed to measuring intensity and/or polarization of a beam of illumination based on scattering of the beam from a volume of air. Embodiments of the present disclosure may be used to align, calibrate, and/or monitor an optical system. For example, illumination scattered from a volume of air contained in an inspection chamber may be collected. Further, the scattered illumination that is collected may be compared to an air scattering standard (e.g., scattering data obtained with known beam characteristics). Further, based on this comparison, one or more states (e.g., intensity or polarization) of the beam may be determined at an instance of time or monitored across a segment of time. It is noted herein that an air standard does not require an insertable physical object be mounted in the system.

Figure 1:
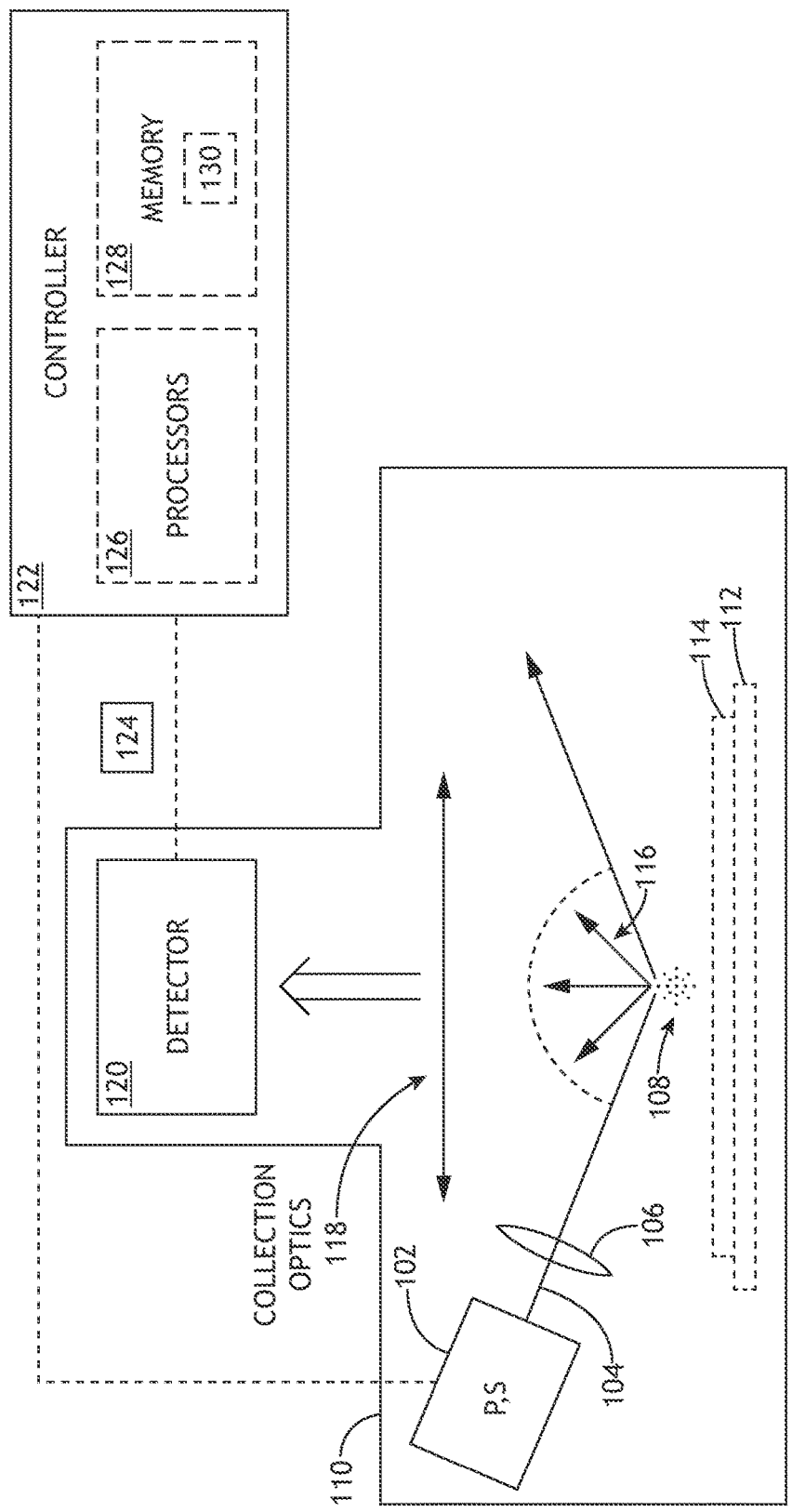
FIG. 1 illustrates a block diagram of an inspection system, in accordance with one or more embodiments of the present disclosure.

FIG. 1 illustrates a conceptual block diagram view of an inspection system 100, in accordance with one or more embodiments of the present disclosure. The inspection system 100 may include one or more illumination sources 102, one or more illumination optics 106, one or more collection optics 118, and a detector 120.

The inspection system 100 may be configured in any inspection configuration known in the art of sample inspection. For example, the inspection system 100 may be, but is not required to be, configured as a darkfield inspection tool.

The one or more illumination sources 102 may include any illumination source known in the art of sample inspection. In one embodiment, the one or more illumination sources 102 are configured to generate one or more beams of illumination 104. For example, the one or more illumination sources 102 may be configured to generate infrared, visible, and/or ultraviolet radiation. In one embodiment, the one or more illumination sources 102 include a narrow band light source. For example, the one or more illumination sources 102 may include, but are not limited to, a laser source. In another embodiment, the one or more illumination sources 102 include a broadband light source. For example, the one or more illumination sources 102 include, but are not limited to, a discharge lamp or a laser-sustained plasma (LSP) light source.

The one or more illumination optics 106 may include any optical element known in the art of sample inspection used to focus, direct, filter, or otherwise condition light from the one or more illumination sources 102. For example, the one or more illumination optics 106 may include, but are not limited to, any combination of the following: one or lenses, one or more mirrors, one or more filters, one or more polarizers, one or more prisms, one or more diffractive elements, one or more beam splitters, and the like.

In another embodiment, the one or more illumination sources 102 and illumination optics 106 are configured to produce P-polarized illumination and/or S-polarized illumination. In another embodiment, illumination 104 is directed to a volume of air 108. The volume of air 108 may be contained within a chamber of the inspection chamber 110.

In another embodiment, the inspection system 100 includes a stage 112 configured to support and secure one or more samples 114. In another embodiment, the inspection system 100 may be configured such that the sample stage 112 is arranged such that detector 120 collects illumination scattered from a volume of air 108 located above the sample stage 112.

The one or more collection optics 118 may include any optical element known in the art of illumination collection used to collect, focus, and direct illumination. For example, the one or more collection optics 118 may include, but are not limited to, any combination of the following: one or more lenses, or one or more mirrors, and the like. For instance, the collection optics 112 may include an objective. In one embodiment, the one or more collection optics 118 are configured to collect air scattered illumination 116. For example, the collection optics 118 may be configured to collect air scattered illumination 116 of infrared, visible, and/or ultraviolet radiation. In another embodiment, the collection optics 118 direct illumination to the detector 120. For example, an objective may direct illumination to the detector 120.

The detector 120 may include any detector known in the art of illumination detection used to detect, sense, record, or amplify illumination. For example, the detector may include, but is not limited to, a charge coupled device (CCD) detector, a photomultiplier tube (PMT) detector, and the like.

The inspection system 100 may include a controller 122 that includes one or more processors 126, and memory 128. In one embodiment, the controller 122 includes one or more processors 126 communicatively coupled to the detector 120 and memory 128. The one or more processors 126 may be configured to execute a set of program instructions 130 maintained in memory 128.

The one or more processors 126 of controller 122 may be programmed to carry out one or more steps of an alignment or calibration procedure as described below. The embodiments of inspection system 100 illustrated in FIG. 1 may be further configured as described herein. In addition, inspection system 100 may be configured to perform any other step(s) of any of the method embodiment(s) described herein.

The one or more processors 126 may receive from the detector 120 one or more signals indicative of a state of the illumination beam 104 scattered from the volume of air 108. For example, the one or more processors 126 may receive one or more signals indicative of an intensity and/or polarization of the illumination scattered from the volume of air 108. The one or more processors 126 may also compare the intensity and/or polarization of scattered illumination 116 to a predetermined intensity and/or polarization standard. In one embodiment, data of scattered illumination 116 may be stored in memory 126 and utilized as a scattering standard. In another embodiment, the one or more processors 126 determine a state of a beam of illumination 104 at one or more times based on a comparison between the intensity and/or polarization of the illumination scattered from the volume of air 108 and a predetermined intensity and/or polarization standard.

The memory 128 may include a set of program instructions 130 to perform analysis of data received by the controller 122 from the detector 120. For example, memory 128 may include a set of program instructions 130 to compare data generated by the detector to a scattering standard.

The set of program instructions 130 may cause the one or more processors 126 to determine an intensity and/or polarization of the beam of illumination at one or more selected times. For example, the set of program instructions 130 may cause the one or more processors 126 to monitor an intensity and/or polarization of the beam of illumination 104 at one or more times.

In one embodiment, an air scattering standard includes data obtained from illumination scattered from a beam of illumination having known characteristics. For example, a scattering standard may include data of detected scattered illumination from a beam of illumination 104 having known intensity characteristics. By way of another example, a scattering standard may include data of detected scattered illumination from a beam of illumination 104 having known polarization characteristics.

In one embodiment, in response to a determination of at least one of intensity or polarization of an illumination beam 104, the one or more illumination sources 102, the one or more illumination optics 106, and/or the one or more of the collection optics 108 are adjusted. For example, a user may adjust the power of the one or more illumination sources 102 based on the determined state of the beam of illumination 104. By way of another example, the one or more processors 126 may adjust the power of the one or more illumination sources 102 based on the determined state of the beam of illumination. By way of another example, the one or more illumination sources 102, the one or more illumination optics 106, and/or the one or more collection optics 108 may be aligned by a user or the one or more processors 126 based on the determined state of the beam of illumination 104.

In one embodiment, one or more of the one or more illumination sources 102, the one or more illumination optics 106, or the collection optics 118 are adjusted until a difference between the collected scattered illumination to a scattering standard is within a selected threshold. For instance, the one or more processors 126 may adjust iteratively or simultaneously the power and/or alignment of the one or more illumination sources 102, and/or the alignment of the one or more illumination optics 106, and/or collection optics 108 until of the difference between collected scattered illumination to a scattering standard is within a selected threshold.

The controller 122 may be configured to receive and/or acquire data or information from other systems (e.g., intensity from a detector, optical element orientation from illumination and/or collection optics) by a transmission medium that may include wireline and/or wireless portions. In another embodiment, the controller 122 may be configured to transmit data or information (e.g., the output of one or more processes disclosed herein) to one or more systems or sub-systems (e.g., illumination optics or collection optics) by a transmission medium that may include wireline and/or wireless portions. In this manner, the transmission medium may serve as a data link between the controller 122 and other subsystems of inspection system 100. Moreover, the controller 122 may send data to external systems via a transmission medium (e.g., network connection).

The detector 120 and controller 122 may be communicatively coupled in any suitable manner (e.g., by one or more wireline or wireless transmission media indicated by the line shown in FIG. 1) such that the controller 122 receives information from the detector 120. In one embodiment, the detector 120 transmits one or more images 124 or intensity data to the controller 122. In another embodiment, one or more images 124 are stored in memory 128.

The one or more processors 126 of controller 122 may include any one or more processing elements known in the art. In this sense, the one or more processors 126 may include any microprocessor device configured to execute algorithms and/or instructions. In one embodiment, the one or more processors 126 consist of a desktop computer, mainframe computer system, workstation, image computer, parallel processor, or other computer system (e.g., networked computer) configured to execute a program configured to operate all or part of the inspection system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 128). Therefore, the above description should not be interpreted as a limitation on the present invention but merely an illustration.

The memory media of memory 128 may include any storage medium known in the art suitable for storing program instructions executable by the associated one or more processors 126. For example, memory 128 may include a non-transitory memory medium. For instance, memory 128 may include, but is not limited to, a read-only memory, a random access memory, a magnetic or optical memory device (e.g., disk), a magnetic tape, a solid state drive and the like. In another embodiment, it is noted herein that memory 128 is configured to store one or more results from inspection system 100 and/or the output of the various steps described herein. It is further noted that memory 128 may be housed in a common controller housing with the one or more processors 126. In an alternative embodiment, the memory 128 may be located remotely with respect to the physical location of the processors 126 and controller 122. For instance, the one or more processors 126 of controller 122 may access a remote memory (e.g., server), accessible through a network (e.g., internet, intranet and the like). In another embodiment, the memory 128 stores the program instructions 130 for causing the one or more processors 126 to carry out the various steps described through the present disclosure.

It is noted that for purposes of simplicity the inspection system 100 has been depicted in a simplified block diagram. This depiction, including the components and geometrical configuration, is not limiting and is provided for illustrative purposes only. It is recognized herein that the inspection system 100 may include any number of optical elements (e.g., lenses, mirrors, filters beam splitter and the like), energy sources (e.g., illumination source) and detectors (e.g., illumination detector) to carry out the comparison of an illumination beam state to an air scatter standard.

Figure 2:
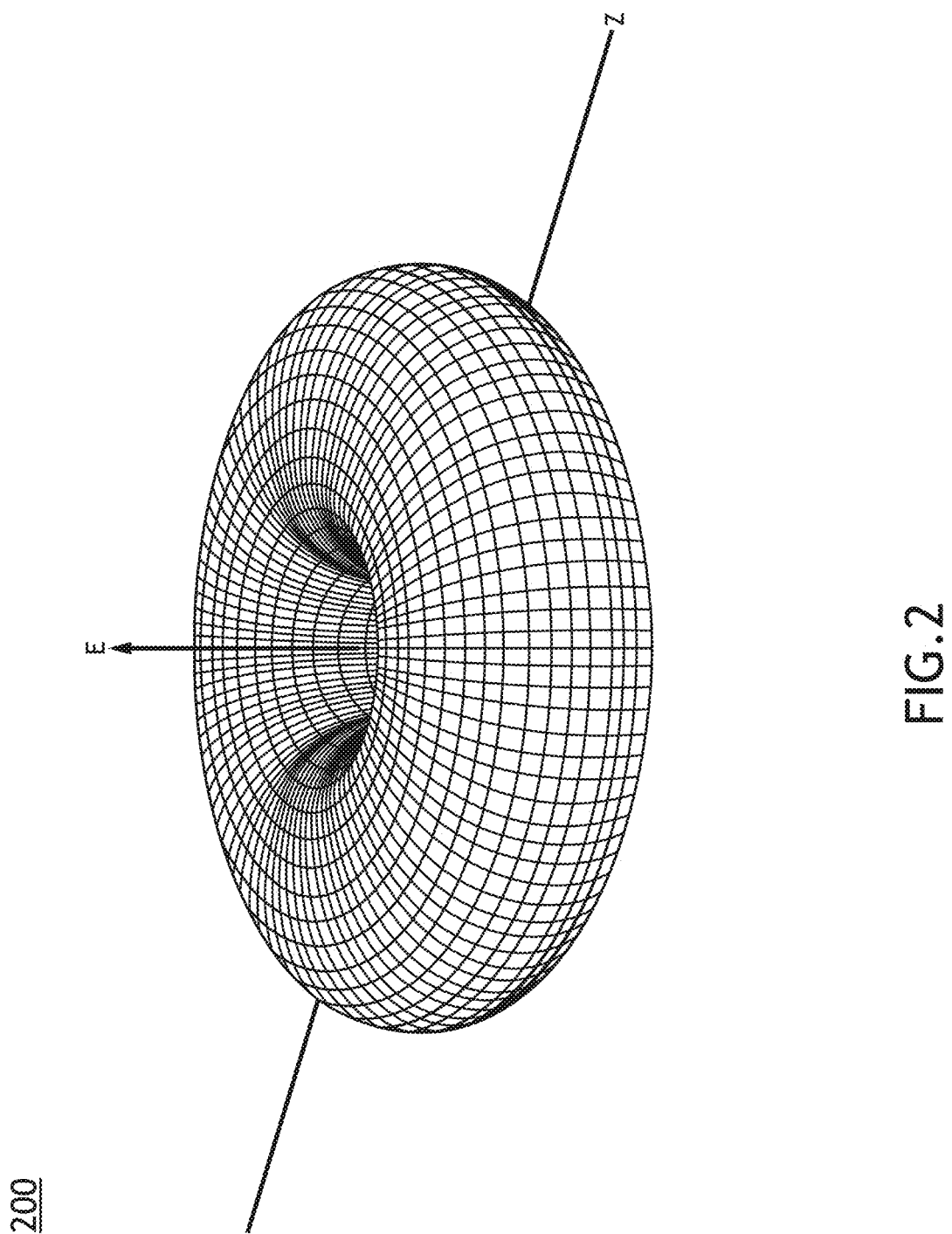
FIG. 2 illustrates a diagram of air scattering intensity, in accordance with one or more embodiments of the present disclosure.

FIG. 2 illustrates a diagram of air scattering intensity 200, in accordance with one or more embodiments of the present disclosure. More specifically, air scattering intensity 200 illustrates a diagram of air scattering intensity of a single scatterer by a single wavelength of polarized electromagnetic radiation. It is noted herein that FIG. 2 illustrates air scattering intensity 200 of radiation polarized in the E direction that is traveling in the Z direction. In one embodiment, air scattering by a single wavelength and polarization of radiation is described by:

$$I = \left(\frac{\mu_0 p_0 \omega^4}{32\pi^2 c}\right)\frac{(\sin\theta)}{r^2}\hat{r}$$

where air scattering intensity is calculated as a function of r, the distance from the scatterer, and the angle θ, the azimuthal angle starting from the E axis. It is noted herein that $\mu_0$ is the permeability of free space, $p_0$ is the maximum dipole moment, ω is the frequency of radiation, θ is the altitudinal angle, and r is the radial distance from the dipole center.

Figure 3A:
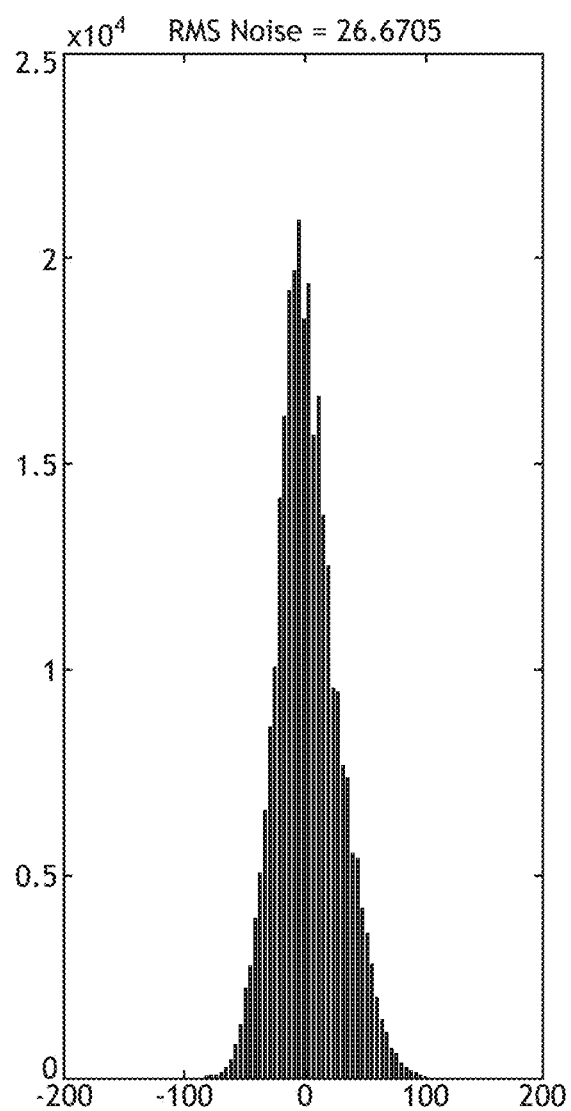
FIG. 3A illustrates root mean square noise of a sensor, in accordance with one or more embodiments of the present disclosure.

FIG. 3A illustrates root mean square (RMS) noise 310 of a SurfScan® sensor, in accordance with one or more embodiments of the present disclosure. More specifically, FIG. 3A illustrates RMS noise 310 for air scattering as measured on a SurfScan® inspection tool for P and S incident polarizations. It is noted therein that the portion of illumination that includes an electric field parallel to the plane of incidence is P-polarized illumination. It is further noted herein that the portion of illumination that includes an electric field perpendicular to the plane of incident is S-polarized illumination.

Figure 3B:
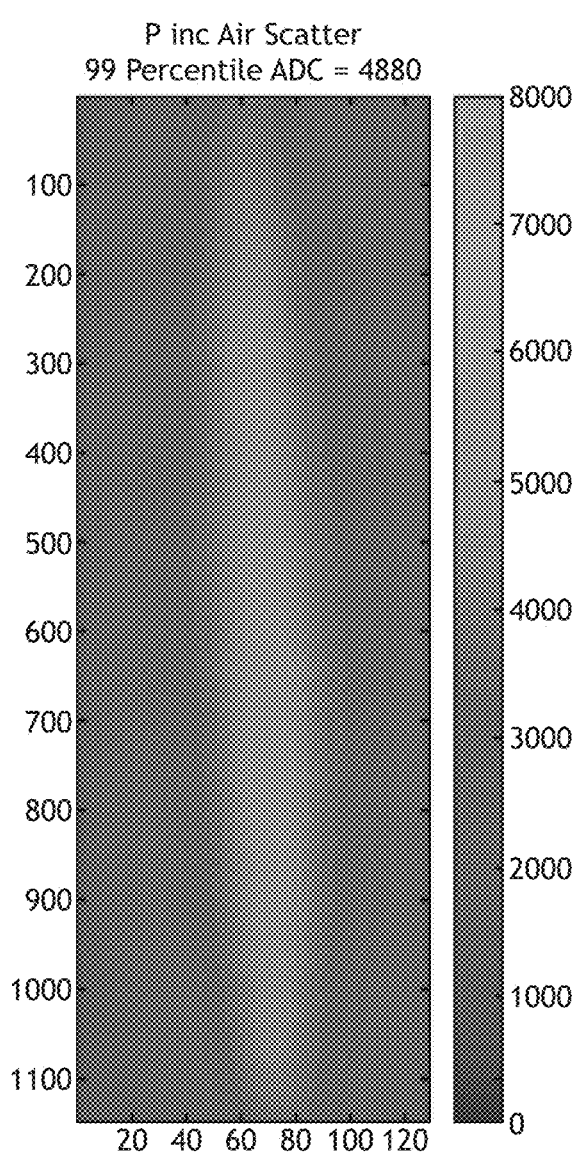
FIG. 3B illustrates air scattering with incident P-polarized light, in accordance with one or more embodiments of the present disclosure.

FIG. 3B illustrates air scattering 320 with incident P-polarized light, in accordance with one or more embodiments of the present disclosure. More specifically, FIG. 3B illustrates P-incident air scattered 320 as measured on a SurfScan® inspection tool from P and S incident polarizations.

Figure 3C:
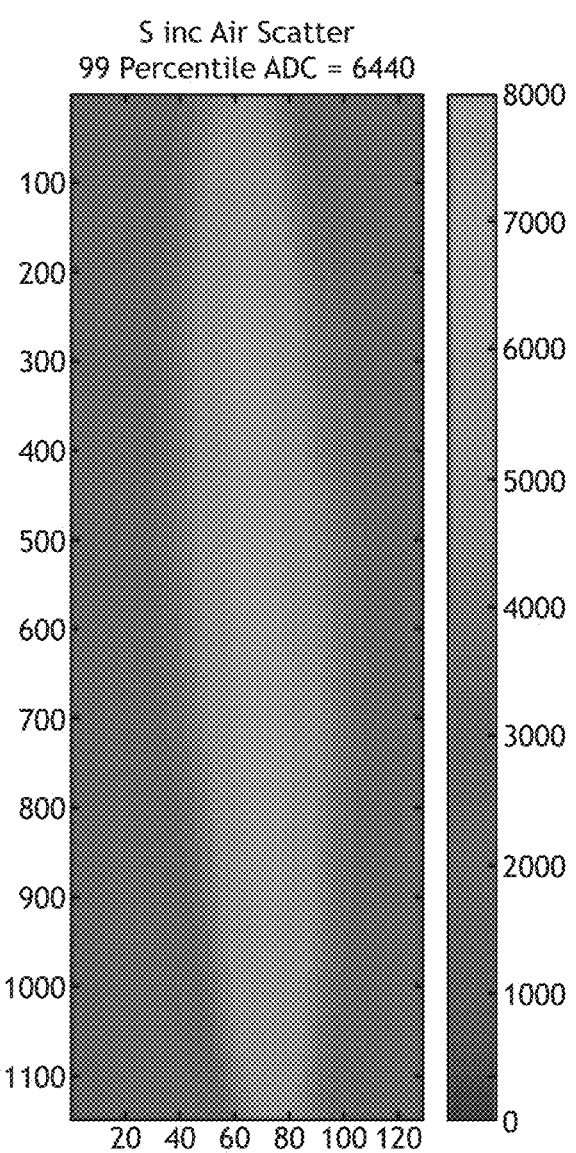
FIG. 3C illustrates air scattering with incident S-polarized light, in accordance with one or more embodiments of the present disclosure.

FIG. 3C illustrates air scattering 330 with incident S-polarized illumination, in accordance with one or more embodiments of the present disclosure. More specifically, FIG. 3C illustrates S-polarized incident air scattered 330 as measured on a SurfScan® inspection tool from P and S incident polarizations.

It is noted herein that air scattering 320 and 330 is measured above the RMS noise 310 of the SurfScan® sensor. It is further noted that the air scattering 320 and 330 measured is incident polarization sensitive. It is further noted herein that air scattering can be utilized as a scattering standard in optical systems and tools.

Figure 4A:
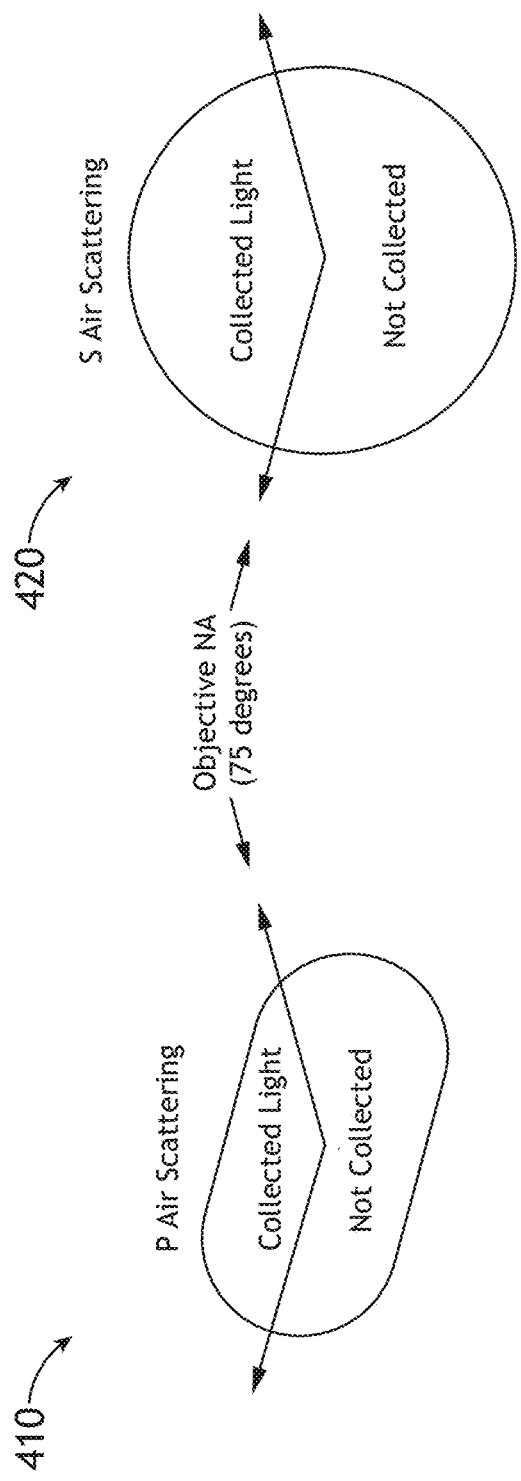
FIG. 4A illustrates an example of air scattering to measure polarization, in accordance with one or more embodiments of the present disclosure.

FIG. 4A illustrates an example of air scattering to measure polarization, in accordance with one or more embodiments of the present disclosure. More specifically, FIG. 4A illustrates an example of P-polarized illumination air scattering 410 and S-polarized illumination air scattering 420 to measure a polarization of illumination where in oblique mode the numerical aperture (NA) of an objective is 75°. In one embodiment, integrating over the region collected by the objective the percentage of total air scatter collected in P-polarized and S-polarized incident light can be calculated. For example, the following equation may be utilized to calculate the percentage of total air scatter collected in P-polarized and S-polarized incident light:

$$P = \int\int \left(\frac{\mu_0 p_0 \omega^4}{32\pi^2 c}\right)\frac{(\sin\theta)^2}{r^2} r^2 \sin\theta \, d\theta \, d\varphi$$

It is noted herein that for the specific example illustrated in FIG. 4A the percentage of P-polarized incident light is 32.1% and the percentage of S-polarized incident light is 41.6%.

Figure 4B:
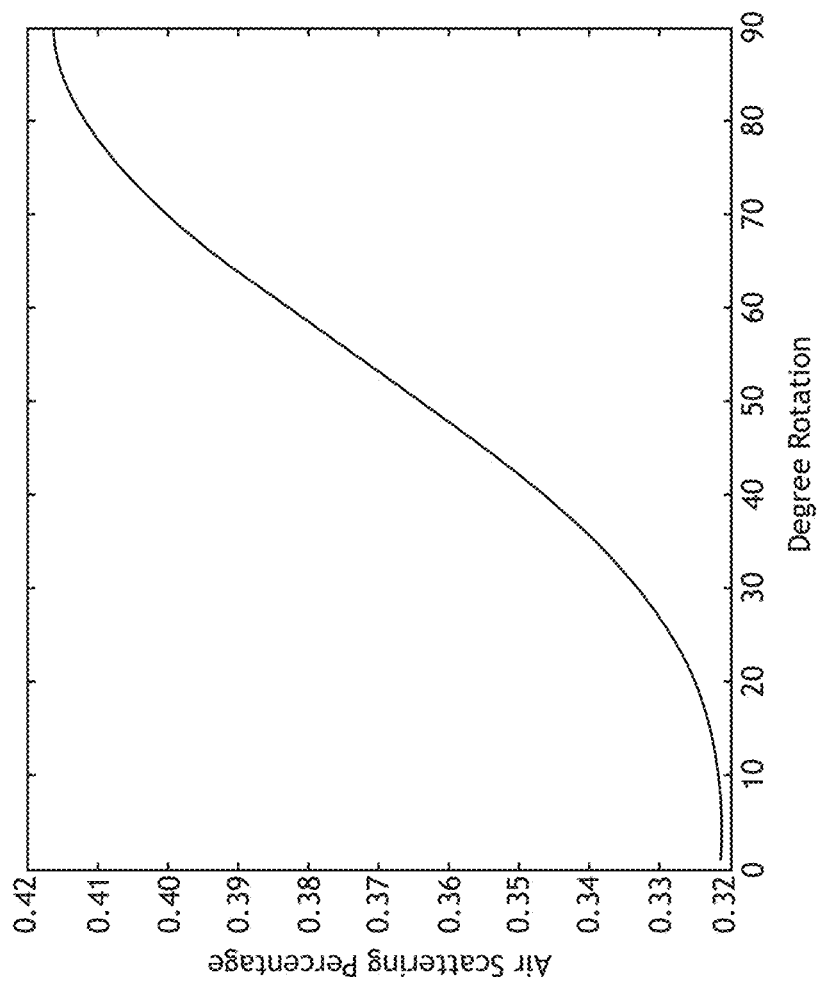
FIG. 4B illustrates an example of air scattering to measure polarizations, in accordance with one or more embodiments of the present disclosure.

FIG. 4B illustrates an example of air scattering to measure polarization, in accordance with one or more embodiments of the present disclosure. More specifically, FIG. 4B illustrates the normalized air scattering power collected by a Surfscan® SP7 objective as beam polarization rotates about the axis of travel. It is noted herein that in FIG. 4B 0 degrees is P-polarized incident light and 90 degrees is S-polarized incident light. It is further noted herein the air scattering pattern shown in FIG. 4B is different for P-polarized and S-polarized incident illumination and indicates air scattering is incident beam polarization sensitive. It is additionally noted herein that when the amount of P-polarized and S-polarized incident illumination intensity captured by an objective is different the intensity ratio of P and S incident illumination can be informative of the quality of polarization of the incident beam.

In one embodiment, inspection system 100 utilizes a signal from scattered illumination 116 to monitor intensity of an incident beam of illumination 104. For example, a signal from scattered illumination 116 may be utilized as a scattering standard to monitor an incident beam of illumination 104 of inspection system 100 over time. In another embodiment, a signal from scattered illumination 116 is utilized for normalization calibration of air scattering intensity across multiple tools. It is noted herein a signal from scattered illumination 116 being stable and uniform is thought to improve system monitoring and calibration.

In one embodiment, inspection system 100 utilizes a signal from scattered illumination 116 to measure polarization of an incident beam of illumination 104. In another embodiment, inspection system 100 utilizes a signal from scattered illumination 116 to monitor polarization of an incident beam of illumination 104. For example, one or more signals from scattered illumination 116 may be utilized to measure polarization of illumination 104 and monitor polarization of illumination 104 over time.

In one embodiment, inspection system 100 utilizes a signal from scattered illumination 116 to align polarization sensitive optics and masks in the collection path. In another embodiment, scattered illumination 116 can be utilized to qualify and monitor optical masks and polarizers. It is noted herein that air scattering provides uniform scattering that is polarized. It is further noted herein any process in an optical system that requires a scattering standard can be performed with air scattering provided air is in the working environment of the system and the system is sufficiently sensitive to measure air scattering intensity. It is additionally noted herein that it is thought systems that rely on an inserted physical scattering standard will benefit from a scattering standard that does not introduce potential contamination and eliminates space constraints due to an insertable physical scattering standard. It is still further noted herein that systems requiring optical calibration and/or alignment that are not feasible due to the constraints created by an insertable physical standard are now realizable utilizing an air scatter standard for alignment and/or calibration.

Figure 5:
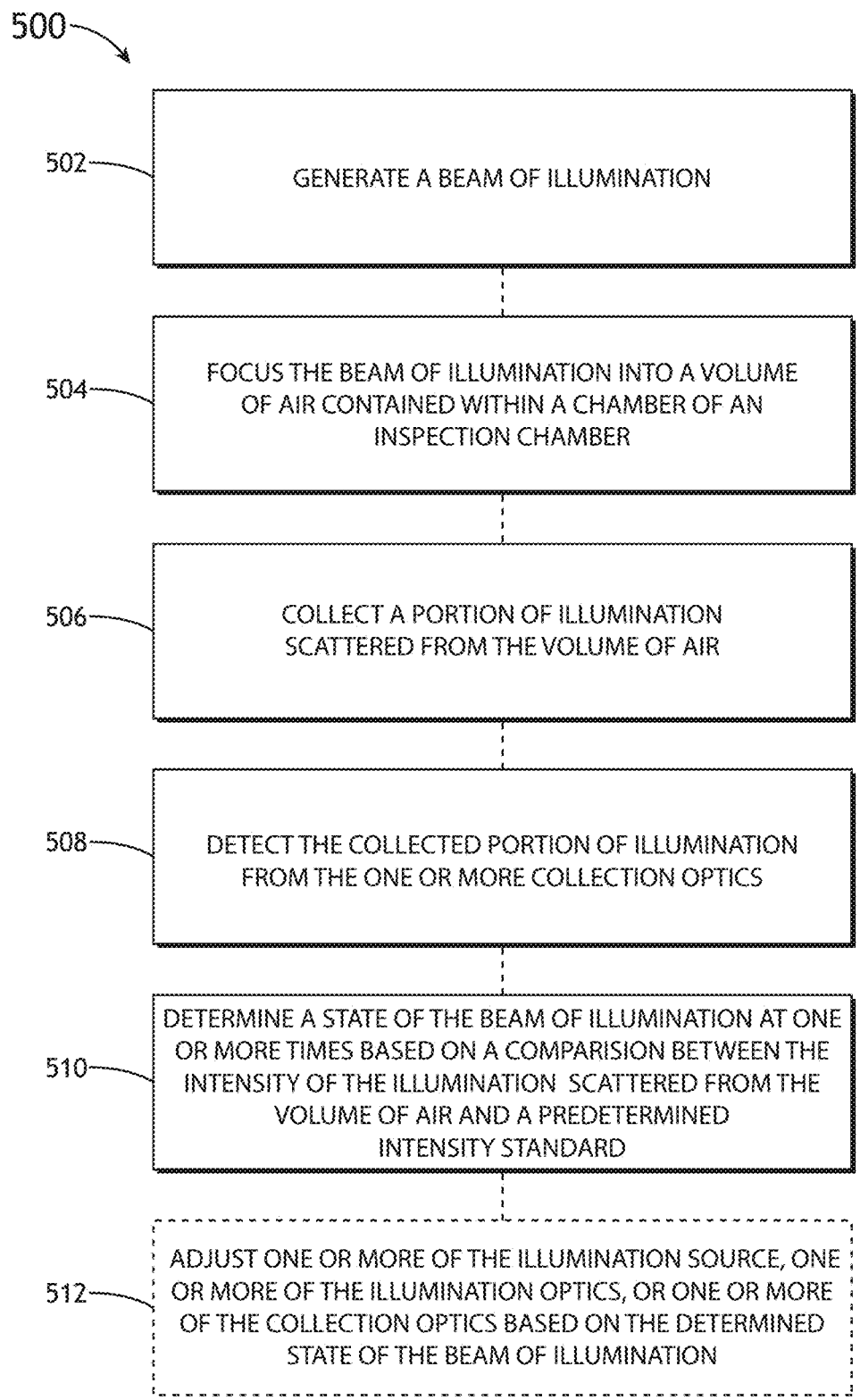
FIG. 5 is a flow diagram illustrating steps performed in a method for determining a state of a beam of illumination in an inspection system, in accordance with one embodiment of the present disclosure.

FIG. 5 is a flow diagram illustrating steps performed in a method 500 for determining a state of a beam of illumination in an inspection system 100, in accordance with one embodiment of the present disclosure. It is noted herein that the steps of method 500 may be implemented all or in part by inspection system 100. It is further recognized, however, that method 500 is not limited to inspection system 100 in that additional or alternative system-level embodiments may carry out all or part of the steps of method 500.

In step 502, one or more illumination sources 102 provide illumination to generate a beam of illumination 104. In one embodiment, the beam of illumination 104 is unpolarized. In another embodiment, the beam of illumination 104 is polarized. For example, the beam of illumination 104 may be one or more of linearly polarized, elliptically polarized, circularly polarizer, or randomly polarized. In another embodiment, illumination 104 includes P-polarized illumination and S-polarized illumination.

In step 504, the beam of illumination is focused into a volume of air contained within a chamber of an inspection chamber. In one embodiment, illumination optics 106 focus illumination 104 to the volume of air 108. For example, illumination optics 106 may be aligned and configured such that illumination 104 is directed toward and focused into a volume of air 108. By way of another example, the illumination optics 106 may be aligned and configured such that illumination 104 is focused into a volume of air 108 contained within an inspection chamber 110 of a darkfield inspection tool.

In step 506, a portion of illumination scattered from the volume of air is collected. In one embodiment, scattered illumination 116 is collected by the collection optics 118. For example, scattered illumination 116 is collected by an objective. In another embodiment, the collection optics 118 are configured to direct scattered illumination toward a detector 120. For example, an objective may be configured to direct scattered illumination 116 collected toward the detector 120.

In step 508, a collected portion of illumination from the one or more collection optics is detected. In one embodiment, a collected portion of scattered illumination 116 from the volume of air 108 is detected by detector 120. For example, the detector 120 may detect scattered illumination 116 collected by the objective and directed toward the detector 120.

In step 510, a state of a beam of illumination 104 is determined at one or more times based on a comparison between the state of the illumination scattered from the volume of air 108 and a predetermined scatter standard. Step 510 includes the detector 120 acquiring one or more images 124 and transmitting the one or more images 124 to the controller 122. The one or more images 124 generated by the detector 120 and transmitted to the controller 122 are compared to a predetermined scatter standard by the one or more processors 126. In one embodiment, the one or more images 124 are stored in memory 128 and used for later analysis. In another embodiment, one or more results from comparison between the state of the illumination scattered from the volume of air 108 and a predetermined scatter standard are stored in memory 128 for later use.

In step 512, adjust one or more of the illumination sources 102, one or more of the illumination optics 106, or one or more of the collection optics 108 based on the determined state of the beam of illumination. For example, the one or more processors 126 may adjust one or more of the one or more illumination sources 102, illumination optics 106, or collection optics 108 based on the determined state of the beam of illumination. By way of another example, the one or more processors 126 may adjust at least one of a power of the one or more illumination sources 102 or an alignment of the one or more illumination sources 102 based on the determined state of the beam of illumination.

Figure 6:
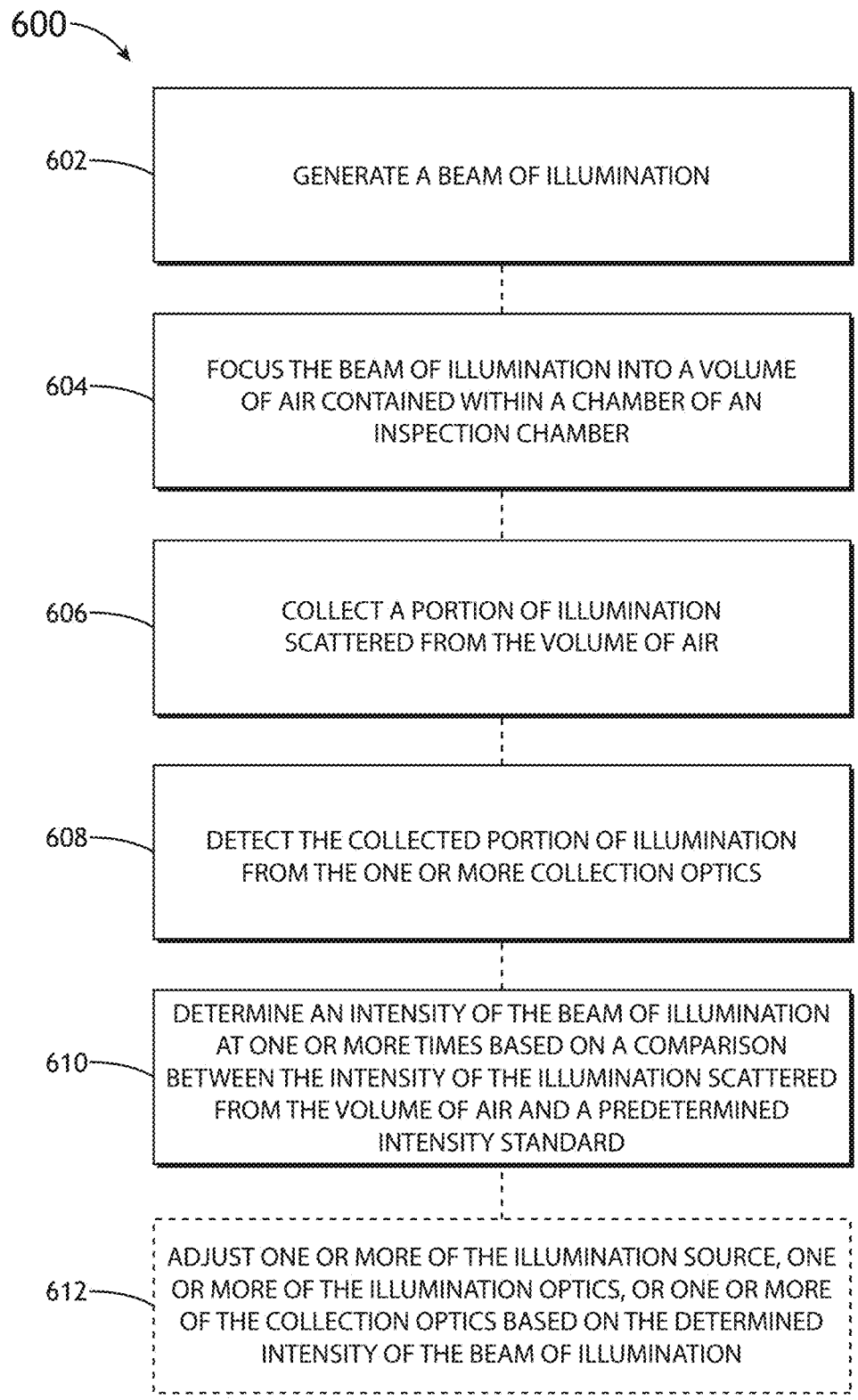
FIG. 6 is a flow diagram illustrating steps performed in a method for determining intensity of a beam of illumination in an inspection system, in accordance with one embodiment of the present disclosure.

FIG. 6 is a flow diagram illustrating steps performed in a method 600 for determining intensity of a beam of illumination in an inspection system 100, in accordance with one embodiment of the present disclosure. It is noted herein that the steps of method 600 may be implemented all or in part by inspection system 100. It is further recognized, however, that method 600 is not limited to inspection system 100 in that additional or alternative system-level embodiments may carry out all or part of the steps of method 600.

In step 602, one or more illumination sources 102 provide illumination to generate a beam of illumination 104. In one embodiment, the beam of illumination 104 is unpolarized. In another embodiment, the beam of illumination 104 is polarized. For example, the beam of illumination 104 may be one or more of linearly polarized, elliptically polarized, circularly polarizer, or randomly polarized. In another embodiment, illumination 104 includes P-polarized illumination and S-polarized illumination.

In step 604, the beam of illumination is focused into a volume of air contained within a chamber of an inspection chamber. In one embodiment, illumination optics 106 focus illumination 104 to the volume of air 108. For example, illumination optics 106 may be aligned and configured such that illumination 104 is directed toward and focused into a volume of air 108. By way of another example, the illumination optics 106 may be aligned and configured such that illumination 104 is focused into a volume of air 108 contained within an inspection chamber 110 of a darkfield inspection tool.

In step 606, a portion of illumination scattered from the volume of air is collected. In one embodiment, scattered illumination 116 is collected by the collection optics 118. For example, scattered illumination 116 is collected by an objective. In another embodiment, the collection optics 118 are configured to direct scattered illumination toward a detector 120. For example, an objective may be configured to direct scattered illumination 116 collected toward the detector 120.

In step 608, intensity of a collected portion of illumination from the one or more collection optics is detected. In one embodiment, an intensity of a collected portion of scattered illumination 116 from the volume of air 108 is detected by detector 120. For example, the detector 120 may detect an intensity of scattered illumination 116 collected by the objective and directed toward the detector 120.

In step 610, an intensity of a beam of illumination 104 is determined at one or more times based on a comparison between the intensity of the illumination scattered from the volume of air 108 and a predetermined intensity standard. Step 610 includes the detector 120 acquiring one or more images 124 and transmitting the one or more images 124 to the controller 122. The one or more images 124 generated by the detector 120 and transmitted to the controller 122 are compared to a predetermined intensity standard by the one or more processors 126. In one embodiment, the one or more images 124 are stored in memory 128 and used for later analysis. In another embodiment, one or more results from comparison between the intensity of the illumination scattered from the volume of air 108 and a predetermined intensity are stored in memory 128 for later use.

In step 612, adjust one or more of the illumination sources 102, one or more of the illumination optics 106, or one or more of the collection optics 108 based on the determined intensity of the beam of illumination. For example, the one or more processors 126 may adjust one or more of the one or more illumination sources 102, illumination optics 106, or collection optics 108 based on the determined intensity of the beam of illumination. By way of another example, the one or more processors 126 may adjust at least one of a power of the one or more illumination sources 102 or an alignment of the one or more illumination sources 102 based on the determined intensity of the beam of illumination.

Figure 7:
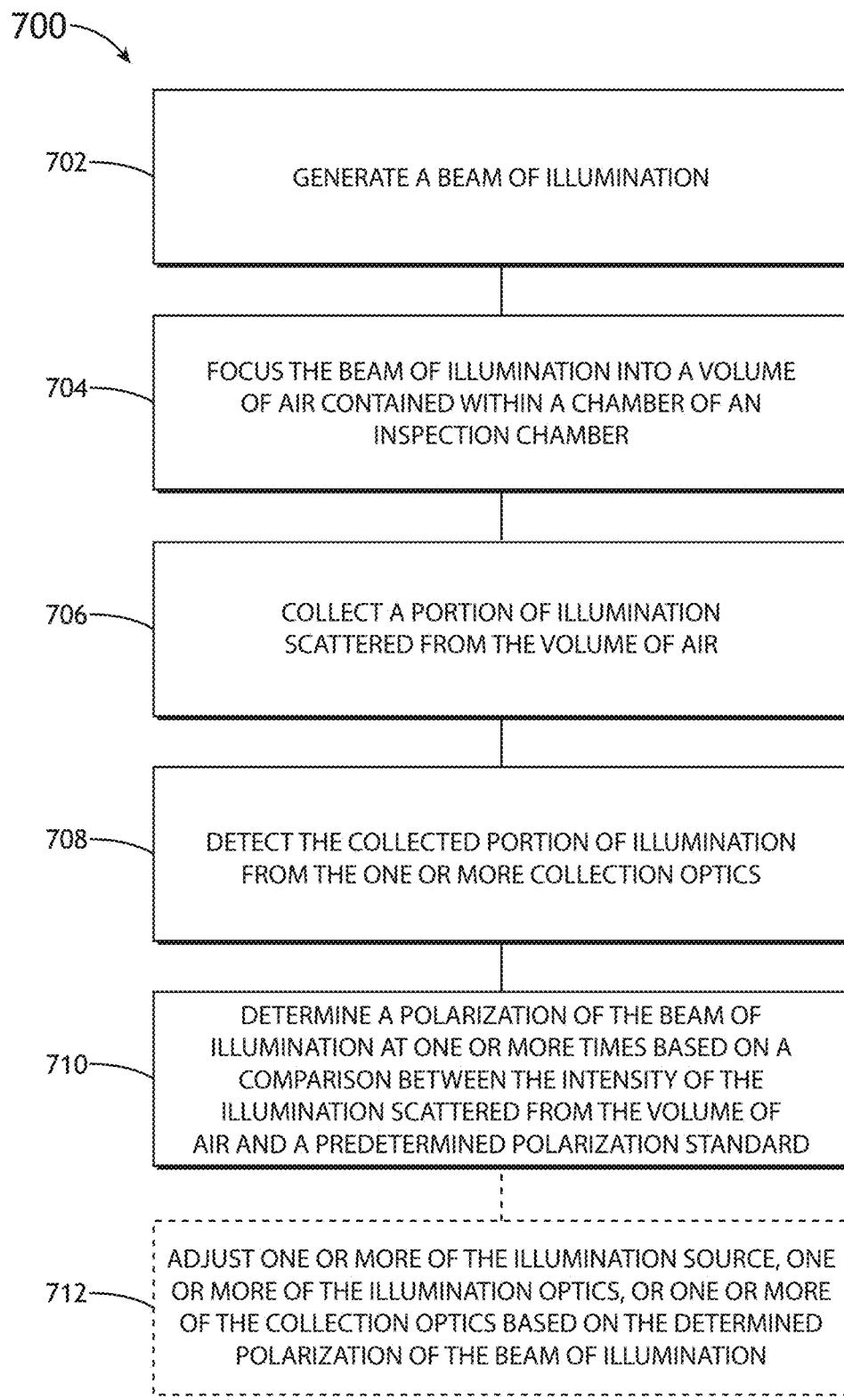
FIG. 7 is a flow diagram illustrating steps performed in a method for determining polarization of a beam of illumination in an inspection system, in accordance with one embodiment of the present disclosure.

FIG. 7 is a flow diagram illustrating steps performed in a method 700 for determining polarization of a beam of illumination in an inspection system 100, in accordance with one embodiment of the present disclosure. It is noted herein that the steps of method 700 may be implemented all or in part by inspection system 100. It is further recognized, however, that method 700 is not limited to inspection system 100 in that additional or alternative system-level embodiments may carry out all or part of the steps of method 700.

In step 702, one or more illumination sources 102 provide illumination to generate a beam of illumination 104. In one embodiment, the beam of illumination 104 is unpolarized. In another embodiment, the beam of illumination 104 is polarized. For example, the beam of illumination 104 may be one or more of linearly polarized, elliptically polarized, circularly polarizer, or randomly polarized. In another embodiment, illumination 104 includes P-polarized illumination and S-polarized illumination.

In step 704, the beam of illumination is focused into a volume of air contained within a chamber of an inspection chamber. In one embodiment, illumination optics 106 focus illumination 104 to the volume of air 108. For example, illumination optics 106 may be aligned and configured such that illumination 104 is directed toward and focused into a volume of air 108. By way of another example, the illumination optics 106 may be aligned and configured such that illumination 104 is focused into a volume of air 108 contained within an inspection chamber 110 of a darkfield inspection tool.

In step 706, a portion of illumination scattered from the volume of air is collected. In one embodiment, scattered illumination 116 is collected by the collection optics 118. For example, scattered illumination 116 is collected by an objective. In another embodiment, the collection optics 118 are configured to direct scattered illumination toward a detector 120. For example, an objective may be configured to direct scattered illumination 116 collected toward the detector 120.

In step 708, polarization of a collected portion of illumination from the one or more collection optics is detected. In one embodiment, a polarization of a collected portion of scattered illumination 116 from the volume of air 108 is detected by detector 120. For example, the detector 120 may detect a polarization of scattered illumination 116 collected by the objective and directed toward the detector 120.

In step 710, a polarization of a beam of illumination 104 is determined at one or more times based on a comparison between the polarization of the illumination scattered from the volume of air 108 and a predetermined polarization standard. Step 710 includes the detector 120 acquiring one or more images 124 and transmitting the one or more images 124 to the controller 122. The one or more images 124 generated by the detector 120 and transmitted to the controller 122 are compared to a predetermined polarization standard by the one or more processors 126. In one embodiment, the one or more images 124 are stored in memory 128 and used for later analysis. In another embodiment, one or more results from comparison between the polarization of the illumination scattered from the volume of air 108 and a predetermined polarization are stored in memory 128 for later use.

In step 712, adjust one or more of the illumination sources 102, one or more of the illumination optics 106, or one or more of the collection optics 108 based on the determined polarization of the beam of illumination. For example, the one or more processors 126 may adjust one or more of the one or more illumination sources 102, illumination optics 106, or collection optics 108 based on the determined polarization of the beam of illumination. By way of another example, the one or more processors 126 may adjust at least one of a power of the one or more illumination sources 102 or an alignment of the one or more illumination sources 102 based on the determined polarization of the beam of illumination.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. An inspection system comprising:
   one or more illumination sources configured to generate a beam of illumination;
   one or more illumination optics configured to focus the beam of illumination into a volume of air contained within a chamber of an inspection chamber;
   one or more collection optics configured to collect a portion of illumination scattered from the volume of air;
   a detector, wherein the detector is configured to receive the collected portion of illumination from the one or more collection optics; and
   a controller, the controller including one or more processors communicatively coupled to the detector, wherein the one or more processors are configured to execute a set of program instructions stored in memory, the set of program instructions configured to cause the one or more processors to:
      receive one or more signals from the detector indicative of an intensity of the illumination scattered from the volume of air; and
      determine a state of the beam of illumination at one or more times based on a comparison between the intensity of the illumination scattered from the volume of air and a predetermined intensity standard.

2. The system of claim 1, wherein the determining a state of the beam of illumination at one or more times based on a comparison between the intensity of the illumination scattered from the volume of air and a predetermined intensity standard comprises:
   determine an intensity of the beam of illumination at a selected time.

3. The system of claim 1, wherein the determining a state of the beam of illumination at one or more times based on a comparison between the intensity of the illumination scattered from the volume of air and a predetermined intensity standard comprises:
   monitor an intensity of the beam of illumination at a plurality of times.

4. The system of claim 1, wherein the determining a state of the beam of illumination at one or more times based on a comparison between the intensity of the illumination scattered from the volume of air and a predetermined intensity standard comprises:
   determine a polarization of the beam of illumination at a selected time.

5. The system of claim 1, wherein the determining a state of the beam of illumination at one or more times based on a comparison between the intensity of the illumination scattered from the volume of air and a predetermined intensity standard comprises:
   monitor a polarization of the beam of illumination at a plurality of times.

6. The system of claim 1, wherein the one or more collection optics comprise an objective.

7. The system of claim 1, wherein the volume of air is contained within an inspection chamber of a darkfield inspection tool.

8. The system of claim 1, wherein the volume of air is located above a sample stage.

9. The system of claim 1, wherein the detector comprises a charge coupled device (CCD) detector.

10. The system of claim 1, further comprising:
    adjusting a state of at least one of the one or more illumination sources, the one or more illumination optics, or the one or more collection optics based on the determined state of the beam of illumination.

11. The system of claim 1, further comprising:
    adjusting at least one of a power of the one or more illumination sources or an alignment of the one or more illumination sources based on the determined state of the beam of illumination.

12. A method comprising:
    generating a beam of illumination;
    focusing the beam of illumination into a volume of air contained within a chamber of an inspection chamber;
    collecting a portion of illumination scattered from the volume of air;
    detecting, with a detector, the collected portion of illumination from one or more collection optics;
    determining a state of the beam of illumination at one or more times based on a comparison between an intensity of the illumination scattered from the volume of air and a predetermined intensity standard.

13. The method of claim 12, wherein the determining a state of the beam of illumination at one or more times based on a comparison between an intensity of the illumination scattered from the volume of air and a predetermined intensity standard comprises:
    determining an intensity of the beam of illumination at a selected time.

14. The method of claim 12, wherein the determining a state of the beam of illumination at one or more times based on a comparison between an intensity of the illumination scattered from the volume of air and a predetermined intensity standard comprises:

monitoring an intensity of the beam of illumination at a plurality of times.

15. The method of claim 12, wherein the determining a state of the beam of illumination at one or more times based on a comparison between an intensity of the illumination scattered from the volume of air and a predetermined intensity standard comprises:

determining a polarization of the beam of illumination at a selected time.

16. The method of claim 12, wherein the determining a state of the beam of illumination at one or more times based on a comparison between an intensity of the illumination scattered from the volume of air and a predetermined intensity standard comprises:

monitoring a polarization of the beam of illumination at a plurality of times.

17. The method of claim 12, wherein the collecting a portion of illumination scattered from the volume of air comprises:

collecting a portion of illumination scattered from the volume of air comprises utilizing an objective.

18. The method of claim 12, wherein the focusing the beam of illumination into a volume of air contained within a chamber of an inspection chamber comprises:

focusing the beam of illumination into a volume of air is contained within an inspection chamber of a darkfield inspection tool.

19. The method of claim 12, wherein the focusing the beam of illumination into a volume of air contained within a chamber of an inspection chamber comprises:

focusing the beam of illumination into a volume of air located contained within an inspection chamber, wherein the volume of air is located above a sample stage.

20. The method of claim 12, wherein the detecting, with a detector, the collected portion of illumination from the one or more collection optics comprises:

detecting, with a charge coupled device (CCD) detector, the collected portion of illumination from the one or more collection optics.

21. The method of claim 12, further comprising:

adjusting a state of at least one of the one or more illumination sources, the one or more illumination optics, or the one or more collection optics based on the determined state of the beam of illumination.

22. The method of claim 12, further comprising:

adjusting at least one of a power of the one or more illumination sources or an alignment of the one or more illumination sources based on the determined state of the beam of illumination.

23. An inspection system comprising:

one or more illumination sources configured to generate a beam of illumination;

one or more illumination optics configured to focus the beam of illumination into a volume of air contained within a chamber of an inspection chamber;

one or more collection optics configured to collect a portion of illumination scattered from the volume of air;

a detector, wherein the detector is configured to receive the collected portion of illumination from the one or more collection optics; and a controller, the controller including one or more processors communicatively coupled to the detector, wherein the one or more processors are configured to execute a set of program instructions stored in memory, the set of program instructions configured to cause the one or more processors to:

receive one or more signals from the detector indicative of an intensity of the illumination scattered from the volume of air; and determine an intensity of the beam of illumination at one or more times based on a comparison between the intensity of the illumination scattered from the volume of air and a predetermined intensity standard.

24. An inspection system comprising:

one or more illumination sources configured to generate a beam of illumination;

one or more illumination optics configured to focus the beam of illumination into a volume of air contained within a chamber of an inspection chamber;

one or more collection optics configured to collect a portion of illumination scattered from the volume of air;

a detector, wherein the detector is configured to receive the collected portion of illumination from the one or more collection optics; and a controller, the controller including one or more processors communicatively coupled to the detector, wherein the one or more processors are configured to execute a set of program instructions stored in memory, the set of program instructions configured to cause the one or more processors to:

receive one or more signals from the detector indicative of an intensity of the illumination scattered from the volume of air; and determine a polarization of the beam of illumination at one or more times based on a comparison between the intensity of the illumination scattered from the volume of air and a predetermined intensity standard.

* * * * *